United States Patent
Li et al.

(10) Patent No.: US 11,910,312 B2
(45) Date of Patent: Feb. 20, 2024

(54) METHOD FOR WIFI MODULE AND SYSTEM OF THE SAME

(71) Applicant: REALTEK SEMICONDUCTOR CORPORATION, Hsinchu (TW)

(72) Inventors: Zhaoming Li, Suzhou (CN); Mengzhou Shen, Suzhou (CN); Zuohui Peng, Suzhou (CN); Guofeng Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 126 days.

(21) Appl. No.: 17/209,619

(22) Filed: Mar. 23, 2021

(65) Prior Publication Data

US 2021/0314861 A1  Oct. 7, 2021

(51) Int. Cl.
   *H04W 52/02* (2009.01)

(52) U.S. Cl.
   CPC ... *H04W 52/0216* (2013.01); *H04W 52/0229* (2013.01)

(58) Field of Classification Search
   CPC ......... H04W 52/0216; H04W 52/0229; H04W 52/0251; H04W 52/0261; H04W 84/12; Y02D 30/70
   See application file for complete search history.

(56) References Cited

U.S. PATENT DOCUMENTS

| | | | |
|---|---|---|---|
| 10,856,228 B1* | 12/2020 | Chu | H04W 52/0235 |
| 2007/0297673 A1* | 12/2007 | Yen | G06V 40/10 |
| | | | 382/173 |
| 2016/0044603 A1* | 2/2016 | Han | H04W 52/247 |
| | | | 370/280 |

(Continued)

FOREIGN PATENT DOCUMENTS

| | | |
|---|---|---|
| CN | 101938819 B | 8/2014 |
| CN | 109076459 A | 12/2018 |
| CN | 110505679 A | 11/2019 |

(Continued)

OTHER PUBLICATIONS

Office action dated Aug. 17, 2021 for counterpart Taiwan application 109126400.

(Continued)

*Primary Examiner* — Marcos L Torres
(74) *Attorney, Agent, or Firm* — WPAT, P.C.; Anthony King (57) ABSTRACT

The present application provides a method for a WiFi module and system of the same. The method including: determining whether a specific process is a high-power consumption event; and when the specific process is determined as the high-power consumption event, performing a time-divisional operation upon the specific process. The present application further provides another method for a WiFi module, including: determining whether a specific process is a high-power consumption event; and when the specific process is determined as the high-power consumption event, estimating a first power consumption request information and transmitting the information to a control module of a local end; and receiving a first response corresponding to the first power consumption request information from the control module.

8 Claims, 5 Drawing Sheets

(56) References Cited

U.S. PATENT DOCUMENTS

2021/0243691 A1    8/2021  Ljung et al.

FOREIGN PATENT DOCUMENTS

| WO | WO2005011143 A1 | 2/2005 |
| WO | WO2015062024 A1 | 5/2015 |

OTHER PUBLICATIONS

English abstract translation of the office action dated Aug. 17, 2021 for counterpart Taiwan application 109126400.
English abstract translation of CN101938819B.
Office Action, Cited References and Search Report dated Nov. 29, 2021 issued by the Taiwan Intellectual Property Office for the Taiwanese corresponding patent application No. 109126400.
Brief English Translation of the Office Action dated Nov. 29, 2021 issued by the Taiwan Intellectual Property Office for the Taiwanese corresponding patent application No. 109126400.
English Translation of CN109076459A.

\* cited by examiner

METHOD FOR WIFI MODULE AND SYSTEM OF THE SAME

TECHNICAL FIELD

The present application relates to a method for a WiFi module; in particular, to a method for the WiFi module for processing a high-power consumption event and a system of the same.

BACKGROUND

WiFi technology has been widely used in many fields in recent years; however, for some applications with strict power consumption restrictions, such as IoT systems, there is an upper limit for the average current that can be continuously and stably supplied. Therefore, when some events that require the WiFi module to continuously work in the active mode take place, the WiFi module or other modules in the system may be underpowered, thereby causing the system to malfunction. Therefore, how to improve the performance of the WiFi module in handling the above-mentioned events has become a pressing issue in the related art.

SUMMARY OF THE INVENTION

Some embodiments of the present disclosure provide a method for a WiFi module, including: determining whether a specific process is a high-power consumption event; and when the specific process is determined as the high-power consumption event, performing a time-divisional operation upon the specific process.

Some embodiments of the present disclosure provide a method for a WiFi module, including: determining whether a specific process is a high-power consumption event; and when the specific process is determined as the high-power consumption event, estimating a first power consumption request information for performing the specific process and transmitting the first power consumption request information to a control module of a local end; and receiving a first response from the control module, wherein the first response corresponds to the first power consumption request information.

Some embodiments of the present disclosure provide a system, including: a WiFi module, configured to determine whether a specific process is a high-power consumption event, and when the specific process is determined as the high-power consumption event, estimate a first power consumption request information for performing the specific process and transmit the first power consumption request information to a control module; and the control module, configured to transmit a first response corresponding to the first power consumption request information to the WiFi module.

The above methods and system are able to improve performance of the WiFi module for processing the high-power consumption event and increase stability of the system.

DETAILED DESCRIPTION

The present application discloses a method and a related system capable of effectively managing the power consumption of a WiFi module, so that when the WiFi module is processing high-power consumption events, the level of effect on the power supply of surrounding modules can be reduced. In particular, for the system with limited continuous power supply capability (i.e., the system with strict power consumption restrictions, such as IoT applications), the method according to the present application can prevent the continuous withdraw of large current by the WiFi module, which may affect power supply on the surrounding modules of the same system where the WiFi module locates that can cause the system instability and even malfunction; details thereof are discussed below.

Figure 1:
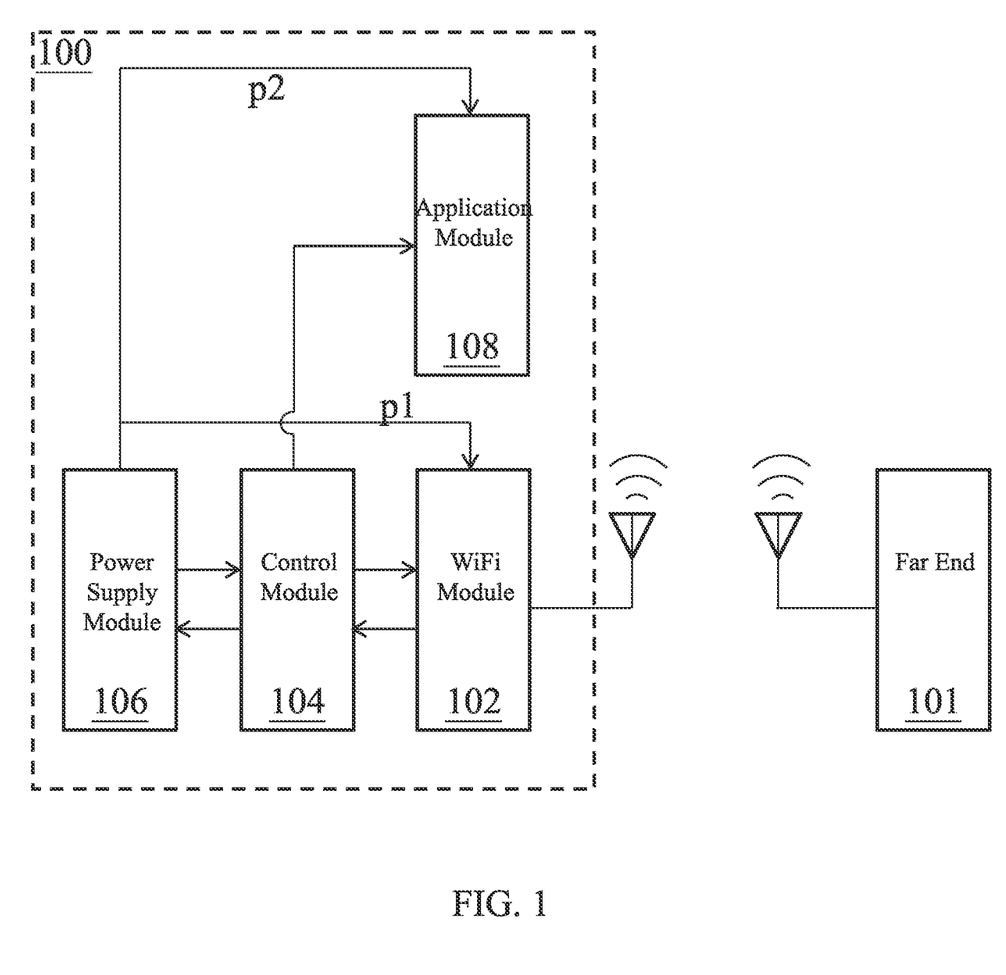
FIG. 1 is a schematic diagram illustrating a system of the present application.

FIG. 1 is a schematic diagram illustrating a system according to the present application. In FIG. 1, a local end system 100 and a far end system 101 are connected to each other via WiFi, and a power supply module 106 supplies power to a WiFi module 102 and an application module 108 via wires p1 and p2, respectively. The local end system 100 can be any system with the WiFi module 102, and the present application does not particularly limit the function of the application module 108; nonetheless, the present application is mainly related to a method capable of effectively managing the power consumption of the WiFi module 102 in cases where the power supply module 106 is subject to strict power consumption restrictions (for example, for a system powered by batteries only, or for a system with restricted power consumption due to the arrangement of the power supply, such as a single wire switch system), so as to keep the average current of the WiFi module 102 within an acceptable range. In this way, the power supply of the application module 108 will not be drastically affected in any event. In other words, the advantages of the present application are best manifested when the local end system 100 is a system with strict power consumption restrictions. Moreover, the end system 101 can be any WiFi devices such as the WiFi AP, WiFi router, etc., and the local end system 100 can access devices such as a computer, mobile phone, server, etc. via the far end system 101.

In a first embodiment of the present application, when the WiFi module 102 is going to perform a specific process, it will first determine whether the specific process is a high-power consumption event beforehand. For example, the above-mentioned high-power consumption event may be but is not limited to at least one of performing a connection process with the far end 101, continuously uploading data to the far end 101, downloading large amount of data from a server via the far end 101 (e.g., over the air (OTA) software/firmware download), or continuous data retransmission. When the WiFi module 102 determines that the specific process is a high-power consumption event, a time-divisional operation is performed upon the specific process; that is, the specific process is divided into several independent sub-processes that can be performed separately at several time points; in this way, the specific process that should have been performed as a whole several sub-processes that are performed separately at several time points, so as to reduce the average current of the WiFi module 102 during the performance of the whole specific process. On the other hand, when the WiFi module 102 determines that the specific process is not a high-power consumption event, it will not perform the time-divisional operation upon the specific process, and only perform the normal processing.

Regarding the continuous data retransmission, when the channel noise is large, the WiFi module 102 may continuously retransmit the packet to the far end 101 to make sure that the far end 101 receives the packet. In this case, the retransmission process results in the increase in the average current. For example, the original specific process is a process with forty continuous retransmissions, then when the specific process is divided into five independent sub-processes, each sub-process only involves eight retransmission, and said five sub-processes can be performed in a flexible way, such as being continuously performed or in a specific mode wherein the five sub-processes being separated by arbitrary time intervals (i.e., the time-divisional operation), so as to lower the average current during the overall retransmission process; see, FIG. 2 to FIG. 4 for details.

Figure 2:
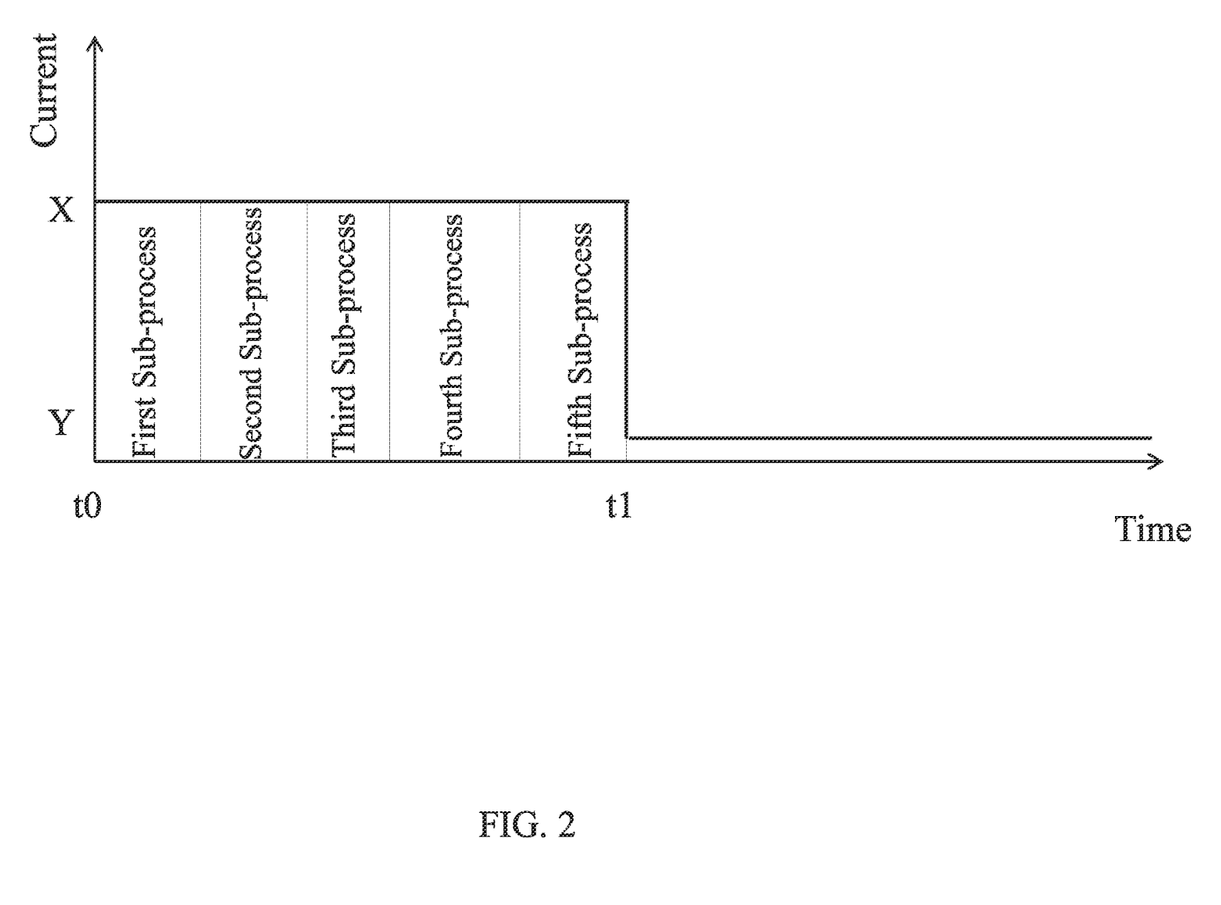
FIG. 2 is a schematic diagram illustrating a WiFi module that does not perform the time-divisional operation upon a specific process.

FIG. 2 illustrates a specific process that includes five sub-processes in a case without time-divisional operation, during the period of t0 to t1, the WiFi module 102 keeps operating in an active mode to perform a first sub-process, a second sub-process, a third sub-process, a fourth sub-process, and a fifth sub-process. Assuming that the respective power consumption (expressed with the current) when the WiFi module 102 performs these sub-processes is X mA each, then, the average current consumed by the WiFi module 102 during the period of t0 to t1 is also X mA. If the power supply module 106 cannot continuously supply a current of X mA to the WiFi module 102 during the period of t0 to t1 (that is, X mA exceeds the upper limit that the power supply module 106 allocates to the WiFi module 102, or even exceeds the upper limit that the power supply module 106 can supply to the whole local end 100), then, performing the specific process as depicted in FIG. 2 results in insufficient power supply to the WiFi module 102; alternatively, the power supply module 106 may be forced to temporarily supply the current of X mA to the WiFi module 102, but since the power supply module 106 has to supply current to the application module 108 at the same time, the application module 108 cannot receive sufficient current.

Figure 3:
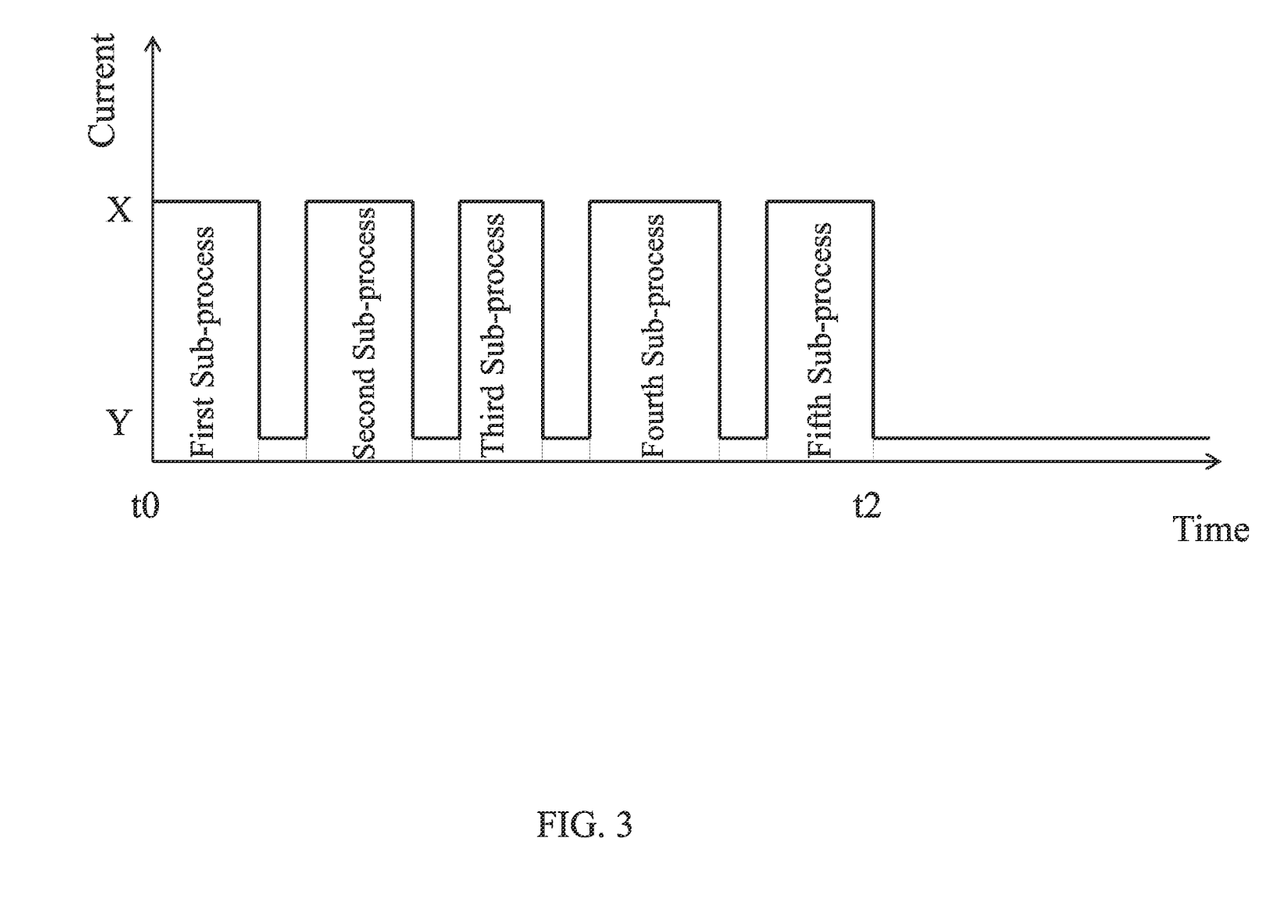
FIG. 3 is a schematic diagram illustrating a WiFi module that performs the time-divisional operation upon a specific process according to a time-divisional operation parameter.

FIG. 3 is a schematic diagram showing that the WiFi module 102 performs a time-divisional operation upon the specific process according to time-divisional operation parameters. FIG. 3 differs from FIG. 2 in that after the WiFi module 102 in FIG. 3 completes the first sub-process, in enters into a specific mode from the active mode, and then performs the second sub-process after the end of a predetermined interval period, and so on. It should be noted that the duration of the predetermined interval period between any two sub-processes may be different, and the average current Y consumed by the WiFi module 102 during the specific mode is lower than the average current X consumed by the WiFi module 102 under the active mode, when performing these sub-processes. In other words, the specific mode is a power-saving mode, and there may be different mode depending on different levels of power-saving, such as the sleep mode or semi-sleep mode, etc. For example, under the sleep mode, other than the circuits necessary for waking up the WiFi module 102, most of the remaining circuit will be switched off; whereas under the semi-sleep mode, only some circuits with greater power consumption are switched off, for example, the radio frequency circuit in the WiFi module 102 is switched off, Since there are four more predetermined interval periods in FIG. 3 than in FIG. 2, the WiFi module 102 takes more time to complete the specific process (i.e., the period of t0 to t2, and t2 is later than t1); therefore, during the period of t0 to t2, the average current consumed by the WiFi module 102 is smaller than X mA. In other word, the present application reduces the average current during the period that the WiFi module 102 performs the specific process by giving it more time. Furthermore, the time-divisional operation parameters may include the time duration of the specific mode, the power consumption of the specific mode and/or the average current consumed by the specific process.

Figure 4:
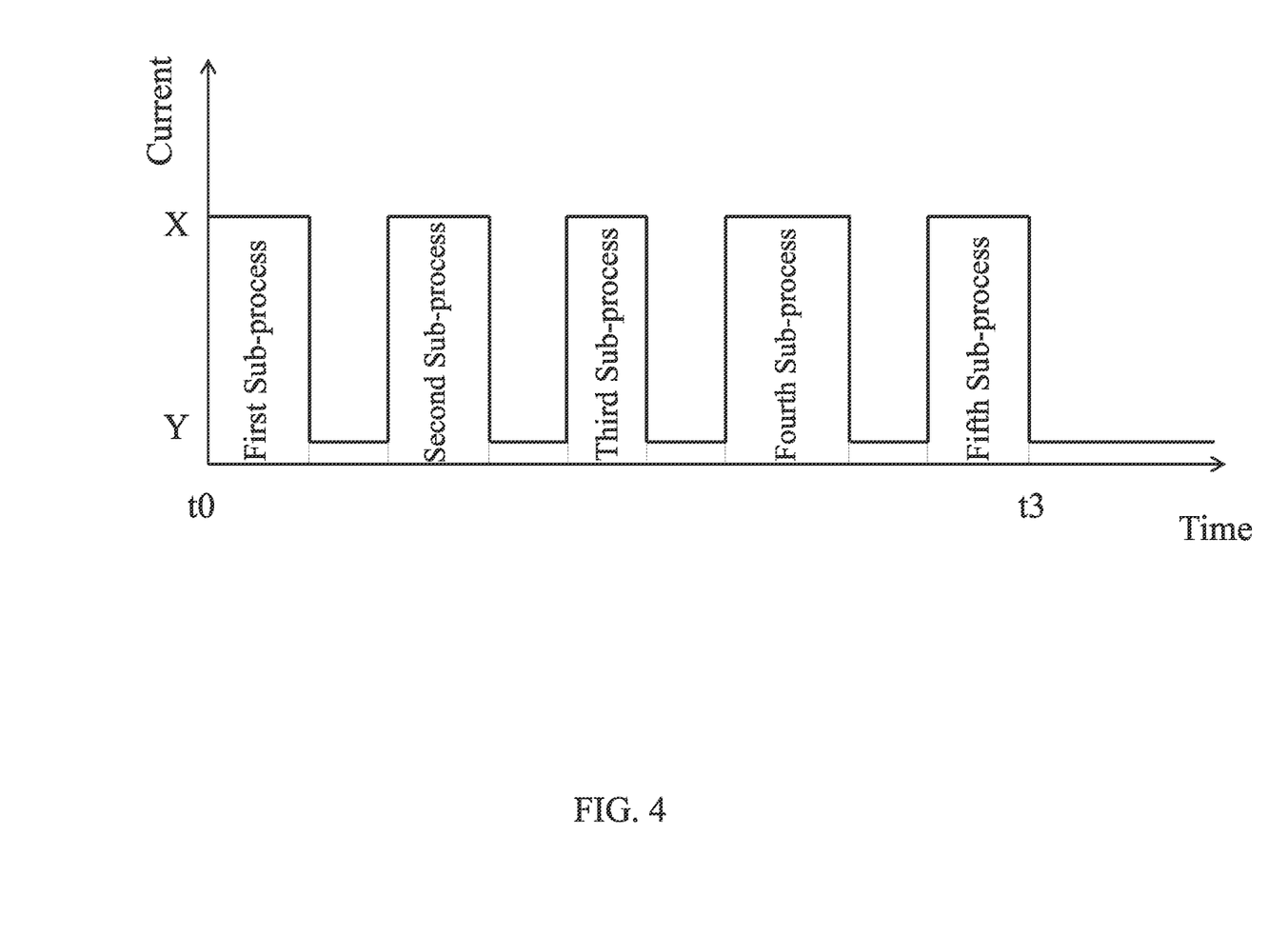
FIG. 4 is a schematic diagram illustrating a WiFi module that performs the time-divisional operation upon a specific process according to a time-divisional operation parameter different from that in the FIG. 3.

FIG. 4 is a schematic diagram showing that the WiFi module 102 performs a time-divisional operation upon the specific process according to time-divisional operation parameters that are different from those in FIG. 3. Compared with FIG. 3, the embodiment in FIG. 4 has a longer predetermined interval period; that is, the WiFi module 102 spends more time to complete the processing of the specific process (i.e., the period of t0 to t3, and t3 is later than t2); therefore, the average current consumed by WiFi module 102 during the period of t0 to t3 is smaller than the average current consumed by the WiFi module 102 during the period of t0 to t2. In other word, the present application may flexibly adjust the predetermined interval period depending on the upper limit of the power consumption allocated to the WiFi module 102.

WiFi module 102 may determine, on its own, whether and how to divide the specific process into the sub-processes, such as the number of sub-processes from the specific process, and the duration of the predetermined interval period; the WiFi module 102 can also request the devices such as computer, mobile phone and server via the far end 101 to divide the specific process into the sub-processes; for example, it can request the server to divide the software/firmware to be downloaded over the air into several segments, so that the WiFi module 102 can enter the specific mode between the downloading processes of the segments.

The present application also provides a second embodiment, which manages the power supply from the power supply module 106 to the WiFi module 102 using the handshake mechanism between the WiFi module 102 and the control module 104. Specific details are described in the flow 300 shown in FIG. 5. In Step 302, when the WiFi module 102 is going to perform a specific process, it will determines whether the specific process is a high-power consumption event before it performs the specific process (see, the description regarding the first embodiment); and if it determines that the specific process is a high-power consumption event, then the WiFi module 102 will estimate the power consumption requirement and transmit the same to the control module 104. For example, the power consumption requirement may include the average current and/or time duration for the WiFi module 102 to perform the specific process.

Figure 5:
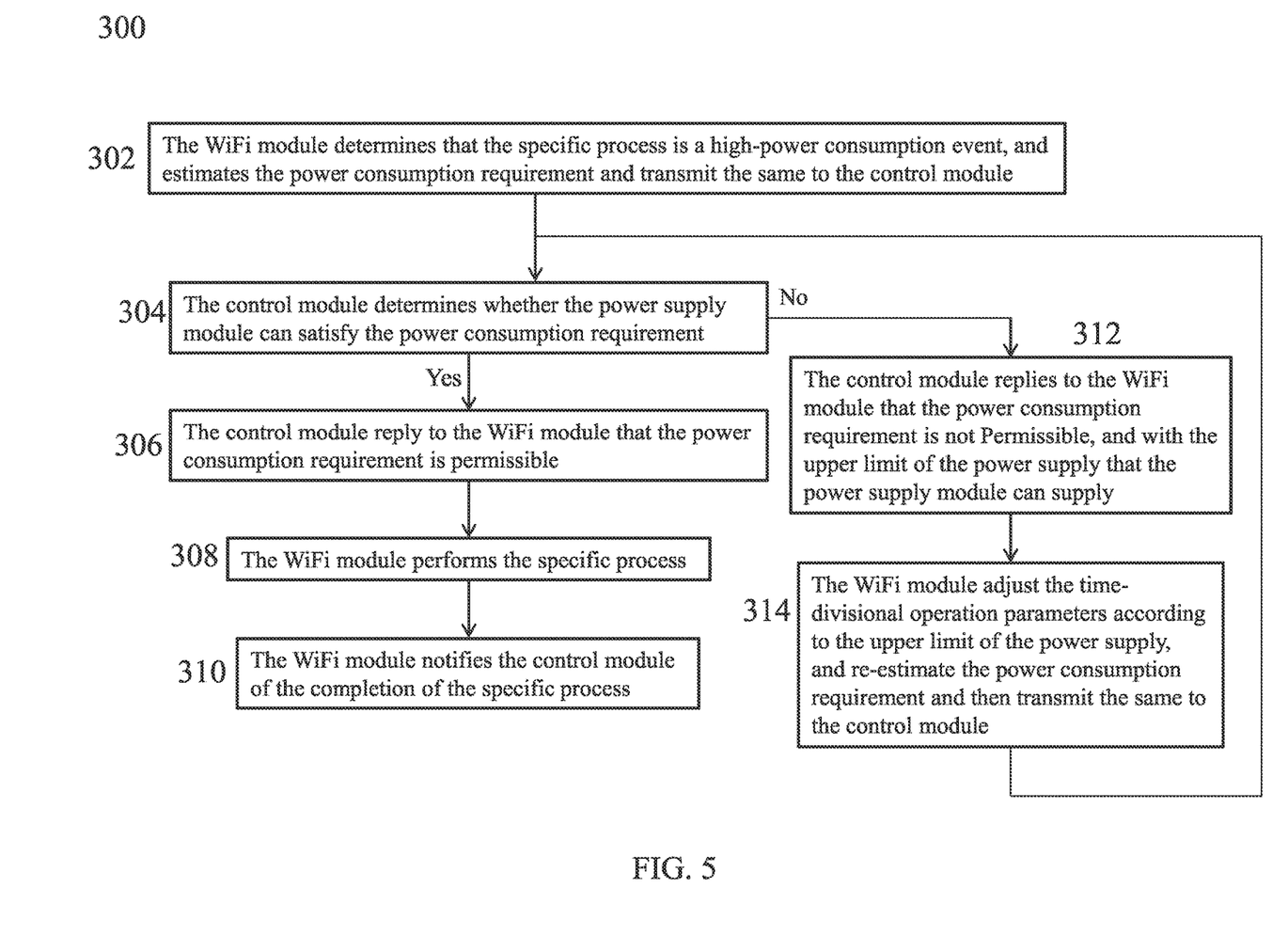
FIG. 5 is a flowchart showing the handshake mechanism of the present application.

In Step 304, the control module 104 receives the power consumption requirement, and determines whether the power supply module 106 can satisfy the power consumption requirement given the current power supply setting of the WiFi module 102; or determines whether it is feasible to temporarily increase the power supply setting of the power supply module 106 to the WiFi module 102 depending on a comprehensive consideration of the status of the application module 108, so as to satisfy the power consumption requirement temporarily. If it is determined that the power supply module 106 can satisfy the power consumption requirement, then the method proceeds to Step 306, in which the control module 104 reply to the WiFi module 102 that the power consumption requirement is permissible. Thereafter, the WiFi module 102 performs the specific process in the Step 308, and after the completion of the performance, the WiFi module 102 would notify the control module 104 about the completion of the specific process in Step 310, so that the control module 104 may adjust the current supplied to the WiFi module 102 by the power supply module 106. For example, it the power supply setting of the power supply module 106 to the WiFi module 102 has been increased temporarily, then it is feasible to decrease the power supply settings back to the original setting.

Returning to Step 304, if the control module 104 determines that the power supply module 106 cannot satisfy the power consumption requirement, then the method proceeds to Step 312, in which the control module 104 reply to the WiFi module 102 that the power consumption requirement is not permissible. In certain embodiments, the control module 104 can also reply to the WiFi module 102 the upper limit of the power supply that the power supply module 106 can supply to the WiFi module 102, such as the average current and/or time duration. Thereafter, in Step 314, the WiFi module 102 would apply the steps described in the first embodiment of the present application, and adjust the time-divisional operation parameters of the specific process to perform the time-divisional operation, and re-estimate the power consumption requirement and then transmit the same to the control module 104. For example, the power consumption requirement that is not estimated based on the time-divisional operation originally is re-estimated according to the first time-divisional operation parameters once again; or the power consumption requirement that has been estimated based on the first time-divisional operation parameters originally is re-estimated once again according to the second time-divisional operation parameters, wherein the re-estimated power consumption requirement is certainly lower than the previously-estimated power consumption requirement. If the control module 104 transmits to the WiFi module 102 the upper limit of the power supply that can be provided to the WiFi module 102, the WiFi module 102 can adjust the time-divisional operation parameters of the specific process according to the upper limit of the power supply so as to prevent an invalid handshake mechanism. Thereafter, the process returns to Step 304 and repeat the steps thereafter.

The above-mentioned second embodiment allows the WiFi module 102 to notify the control module 104 in advanced before the high-power consumption event, and the specific process can be performed without affecting the overall power supply stability of the local end 100 according to the status of the power supply module 106 through the handshake mechanism between the WiFi module 102 and the control module 104.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software and/or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A method for a WiFi module, comprising:
   determining whether a specific process is a high-power consumption event;
   when the specific process is determined as the high-power consumption event, estimating a first power consumption request information for performing the specific process and transmitting the first power consumption request information to a control module;
   receiving a first response from the control module, wherein the first response corresponds to the first power consumption request information;
   dividing, by the WiFi module, the specific process into a first sub-process and a second sub-process according to the first response; and
   performing a time-divisional operation upon the specific process, comprising:
      performing the first sub-process of the specific process; and
      after completion of the first sub-process, waiting for a predetermined interval period and then performing the second sub-process of the specific process, wherein a duration of the predetermined interval period is adjusted depending on an upper limit of a power consumption allocated to the WiFi module.

2. The method of claim 1, wherein the determining whether the specific process is the high-power consumption event comprises:
   determining whether the specific process is at least one of a connecting process, continuous data uploading or downloading, or continuous data retransmission.

3. The method of claim 1, wherein:
   the performing the first sub-process of the specific process comprises:
      performing the first sub-process in an active mode;
   the waiting for the predetermined interval period comprises:
      entering into a specific mode during the predetermined interval period; and
   the performing the second sub-process of the specific process comprises:
      performing the second sub-process in the active mode.

4. The method of claim 3, wherein in the specific mode, a current required by the WiFi module is smaller than a current required in the active mode.

5. The method of claim 4, wherein the specific mode is a power-saving mode.

6. The method of claim 1, further comprising:
   notifying a far end of the WiFi module that the WiFi module needs to perform the time-divisional operation.

7. The method of claim 1, further comprising:
   when the first response indicates that the control module disagrees the WiFi module to perform the specific process, estimating a second power consumption request information for performing the time-divisional operation upon the specific process and transmitting the second power consumption request information to the control module.

8. The method of claim 7, wherein the first power consumption request information comprises a first average current for performing the specific process as a whole; and the second power consumption request information comprises a second average current for performing the time-divisional operation upon the specific process, and the second average current is smaller than the first average current.

* * * * *